A. W. WESSOLECK.
CLUTCH FOR SPEEDOMETERS AND THE LIKE.
APPLICATION FILED NOV. 14, 1912.
1,081,934.
Patented Dec. 16, 1913.
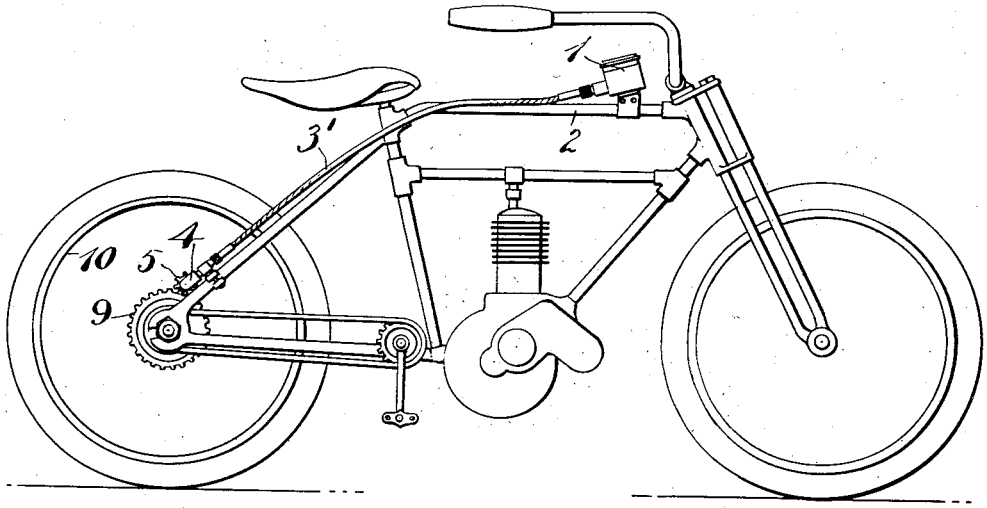
Fig. 1.
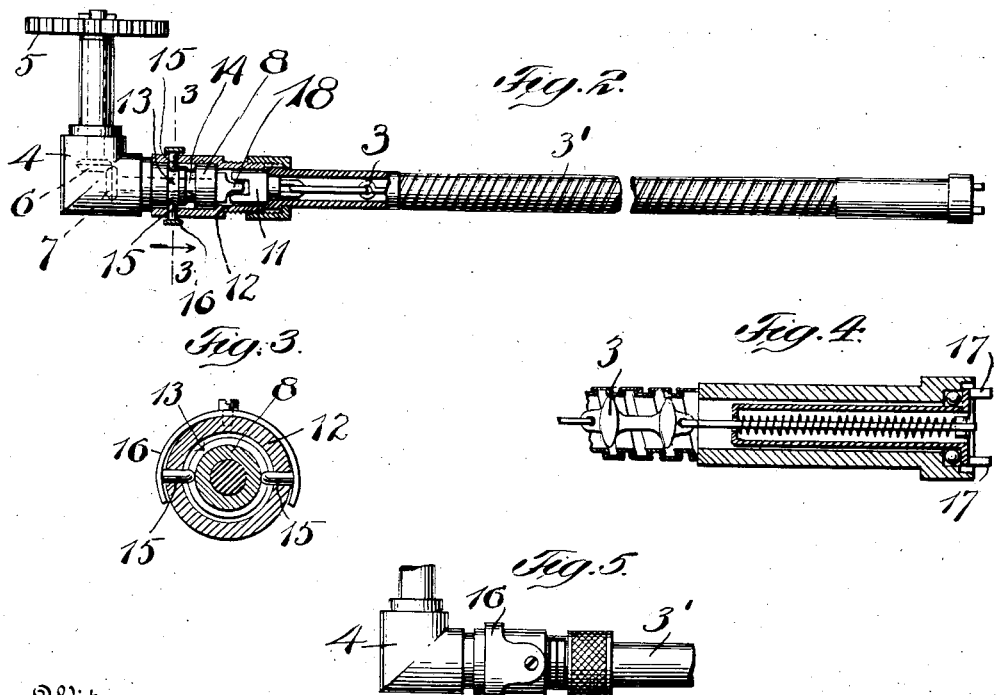
Witnesses:
Inventor
A. W. Wessoleck
By his Attorneys

UNITED STATES PATENT OFFICE.

AUGUSTUS W. WESSOLECK, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

CLUTCH FOR SPEEDOMETERS AND THE LIKE.

1,081,934. Specification of Letters Patent. Patented Dec. 16, 1913.

Application filed November 14, 1912. Serial No. 731,271.

*To all whom it may concern:*

Be it known that I, AUGUSTUS W. WESSOLECK, a citizen of the United States, residing at New Britain, Hartford county, State of Connecticut, have invented certain new and useful Improvements in Clutches for Speedometers and the like, of which the following is a full, clear, and exact description.

My invention relates to an improved driving connection for speedometers, particularly as associated with motor bicycles. As is well known, it is the preferable practice in the use of motor bicycles to connect the speedometer or odometer with the driving wheel of the vehicle as it is frequently desirable to lift the driving wheel off the ground and run it by the motor during the warming up period of the latter. It is at once apparent that the odometer is caused to register inaccurately, the total mileage being increased to the extent that the driving wheel is revolved by the motor when lifted free of the ground.

To that end it is my purpose to provide a very simple and effective clutch mechanism by which the odometer can be quickly disconnected from or connected with the driving wheel whereby when it is desired to run the driving wheel idly, the same may be done without operating the odometer.

In the accompanying drawings, Figure 1 is a side elevation of a motor bicycle equipped with my invention, the said vehicle being shown only conventionally. Fig. 2 is a relatively enlarged detail view, partly in section. Fig. 3 is a relatively enlarged cross sectional view on the line 3—3 of Fig. 2. Fig. 4 is a longitudinal section showing certain details of the clutch and associated parts. Fig. 5 is a plan view of a part of the clutch.

1 represents an odometer which is suitably mounted upon some part of the frame 2 of a bicycle, such as a motor bicycle. The particular construction of the odometer is immaterial. The odometer mechanism is, however, driven by means of a shaft, usually flexible, such a shafting being indicated at 3. This shafting extends back of what I will term a right angle gear housing 4, which represents one conventional type of holder for the driving pinion.

5 is the driving pinion which is usually connected by means of beveled gears indicated in dotted lines at 6 and 7 within the housing (Fig. 2), with the flexible shaft. In this particular instance, the gear 7 is mounted on a rotatable head 8 so that the head 8 will turn with the driving pinion 5, the latter being turned from a driving gear 9 mounted on the vehicle wheel 10.

The particular construction of the flexible shaft 3 is immaterial, but ordinarily such shafting is provided with an external flexible protecting housing 3' within which the rotatable part of the shafting (usually formed of links) is located. In this particular instance, and in the preferred form of construction, the end link 11 of the flexible shaft is carried within a sleeve 12 which in turn is connected with the external flexible but substantially non-extensible housing of the flexible shaft 3. The sleeve 12 is mounted upon the head 8 and is capable of being slid to and fro so as to be shifted from an operative to an inoperative position. In Fig. 2, the parts are shown in the operative position. In this position, the link 11 constitutes one part of a clutch which stands in operative engagement with the end of the head 8 which constitutes the other part of the clutch. The end of the head 8 is provided with a clutch member 18 which is arranged to enter a recess in the end of the end link 11, said recess being shaped to allow said clutch end 18 to enter the same but not turn independently thereof. The head 8 is provided with two annular grooves 13—14, while the sleeve 12 is provided with one or more locking detents 15—15, the inner ends of which are arranged to engage in the grooves 13 or 14, according to the position of the sleeve 12 on the head 8.

16 is a suitable spring serving to press the detents 15—15 forwardly into the engaging position, said spring yielding, however, at the proper time to permit said detents to move back.

The forward end of the flexible shaft 3 is suitably provided with a clutch member 17 which engages with the odometer mechanism within the odometer 1 and is normally held in operative engagement therewith excepting when it is desired to disassemble the parts.

Assuming it is desirable to raise the driving wheel 10 from the ground and to permit it to rotate idly, the operator simply pulls laterally on the flexible shaft 3. This shafting being secured to the odometer 1 as an abutment cannot yield at that end but it may, however, yield at the opposite end, with the result that the sleeve 12 is slid forwardly upon the head 8, the detents 14 shifting from the groove 13 to groove 14. This forward movement of the sleeve 12 on the head 8 disconnects the clutch engagement between the parts 18—11 so that the driving wheel 10 and the driving gear 9, the pinion 5 and the head 8 may be rotated without rotating the flexible shaft and causing the odometer to register. When it is desired to use the vehicle, the wheel 10 is lowered to the ground, and the flexible shaft is straightned out, causing the rear end of the shafting 3 to be pushed back so as to engage the clutch members 9—11 and then as the vehicle proceeds, the rotation of the wheel 10 will cause the rotation of the flexible shafting which operates the odometer and the mileage will be registered thereby in accordance with the actual distance traveled.

I have found that by this construction the connection and disconnection of the odometer registering mechanism may be very quickly and easily effected inasmuch as the shaft always passes conveniently to the hand of the operator and is very easily shifted for the purpose described, although when in operative position, is held with sufficient firmness to guard against any accidental or unintentional disengagement.

While I have shown my invention as applied to a motor bicycle, it is obvious that its use is not necessarily confined thereto, although it is of particular utility when employed with such a vehicle, because of the reasons before assigned.

While I have shown the clutch as associated with the gear housing, it is obvious that its particular location is not necessarily confined to that shown, it being merely essential, in a broad sense, that this clutch be provided somewhere between the source of power by which the odometer is driven and the registering mechanism of said odometer.

What I claim is:

In a device of the character described, an odometer or the like having a fixed position, a rotatable driver having a relatively fixed position, a driven device arranged to coöperate with said driver, a shafting non-extensible but laterally flexible, one end of said shafting being connected to said odometer, the other end being detachably connected with said driven member, a clutch comprising said detachable connection, one part of said clutch being associated directly with said driven member, the other part being associated directly with said flexible shafting, said clutch including a yielding means to frictionally hold said clutch parts in the engaged or disengaged position at will.

AUGUSTUS W. WESSOLECK.

Witnesses:
JOHN HERBERT ANNEAR,
HERBERT BROWNE.